UNITED STATES PATENT OFFICE.

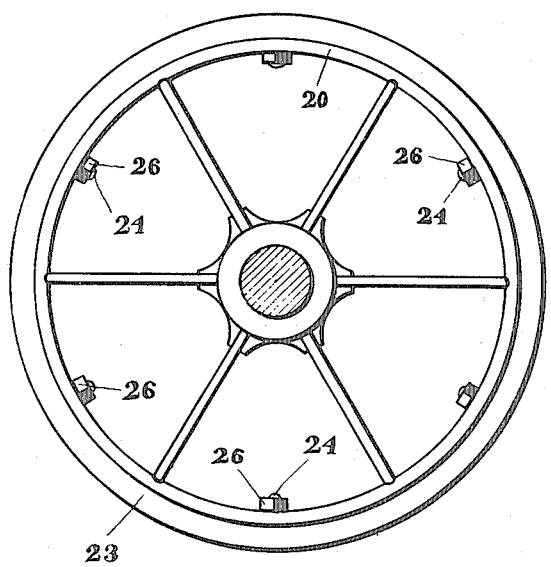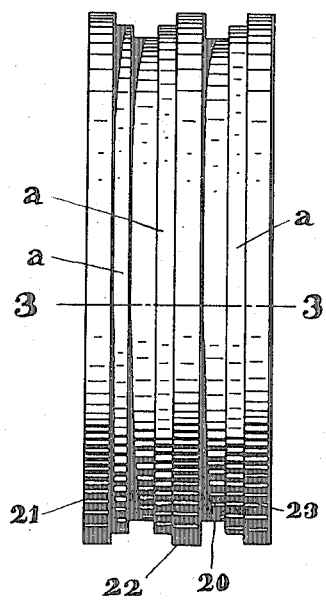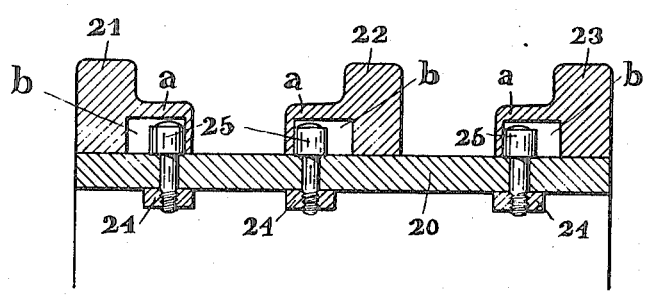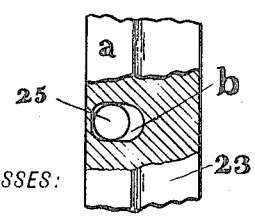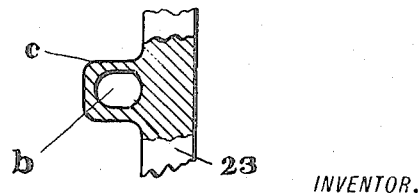

GERARD T. SEGEE, OF REVERE, MASSACHUSETTS.

VOID-TIRE.

1,153,348. Specification of Letters Patent. Patented Sept. 14, 1915.

Application filed April 12, 1915. Serial No. 20,604.

*To all whom it may concern:*

Be it known that I, GERARD T. SEGEE, a citizen of the United States, residing at Revere, in the county of Suffolk, in the State of Massachusetts, have invented a certain new and useful Improvement in Void-Tires for Road-Rollers, of which the following is a specification, reference being had to the accompanying drawings.

The object of this invention is to provide a simple but effective form of socalled void tire for use with the traction wheels of road rollers and the like machines, special provision being made whereby the said tire may have limited lateral play on the said wheel as I shall explain more fully later.

In order to explain my invention clearly I have provided the annexed drawings, in which—

Figure 1 is a side view of a wheel having mounted thereon a void tire embodying my present improvement and Fig. 2 is a face view of the same. Fig. 3 is a relatively enlarged sectional view of the rim and tire taken on the line 3—3 of Fig. 2. Fig. 4 is a plan of a portion of one of the void tire sections partly broken away to disclose the chamber in which one of the retaining bolts is located, and Fig. 5 is a similar view of a tire section in which the continuous flange $a$ is dispensed with and lateral extensions $c$ are substituted for the said flange.

Briefly described my improvement comprises a plurality of independently acting annular, metallic, tires each tire being held in place upon the wheel rim by bolts which permit the said tires to move a limited distance, laterally on the face of the wheel rim but which prevent the tire from "crawling" on said rim.

Referring to the annexed drawings, the numeral 20 indicates a wheel rim which, we may assume, is the rim of one of the traction wheels of a steam road roller of the type commonly used in road making. Mounted upon said rim is my improved void tire consisting, as here shown, of three independently operable tire sections 21, 22 and 23 but, as these tire sections are all alike in construction and operation, I will describe only one of them in detail. Each tire section proper is formed as an annulus which has an integral lateral flange $a$ which is chambered, as at $b$, at stated distances apart, to receive suitable retaining bolts, or lateral lugs $c$ may be provided in place of the said flange $a$ (see Fig. 5). The said retaining bolts are designated by the numerals 24 and are formed with substantial head portions 25, which extend into the chambers $b$ the said chambers being elongated in the direction transverse to the length of the tire section, as is best seen in Figs. 4 and 5 of the drawings, this construction permitting the tire to slip laterally on the wheel rim 20 a limited distance but preventing the tire from "crawling" on said rim. Bolts 24 are secured rigidly to the wheel rim 20 by means of nuts 26.

The office of void tires, of the type to which my present improvement belongs, is to distribute evenly, and to roll down smoothly, crushed stone, and more particularly to crowd such stone into hollows and pack it firmly in order to produce a level roadbed. By constructing my void tire of a plurality of sections that are independently movable in a direction transverse to the line of movement of the road machine, I find that, when the said tire sections engage crushed stone which has been unevenly distributed along the roadway, the said tire sections slip laterally on the wheel rim with a tendency to correspondingly move the stone and rearrange it and thus lay it evenly before it is packed down.

Having thus described my invention, I claim as new and wish to secure by Letters Patent:—

1. In combination with a wheel rim, a void tire of annular form mounted on said rim, means for securing the tire against "crawling" on the rim while permitting a limited lateral movement of the tire with respect to the rim.

2. In combination with a wheel rim, a plurality of annular void tire sections mounted upon said rim, each section being formed with chambers that are elongated transversely to the line of movement of the said wheel, and bolts secured to the wheel rim and extending into the said chambers.

GERARD T. SEGEE.